No. 607,759. Patented July 19, 1898.
J. MATHY.
BAKING PAN.
(Application filed Mar. 4, 1898.)
(No Model.)
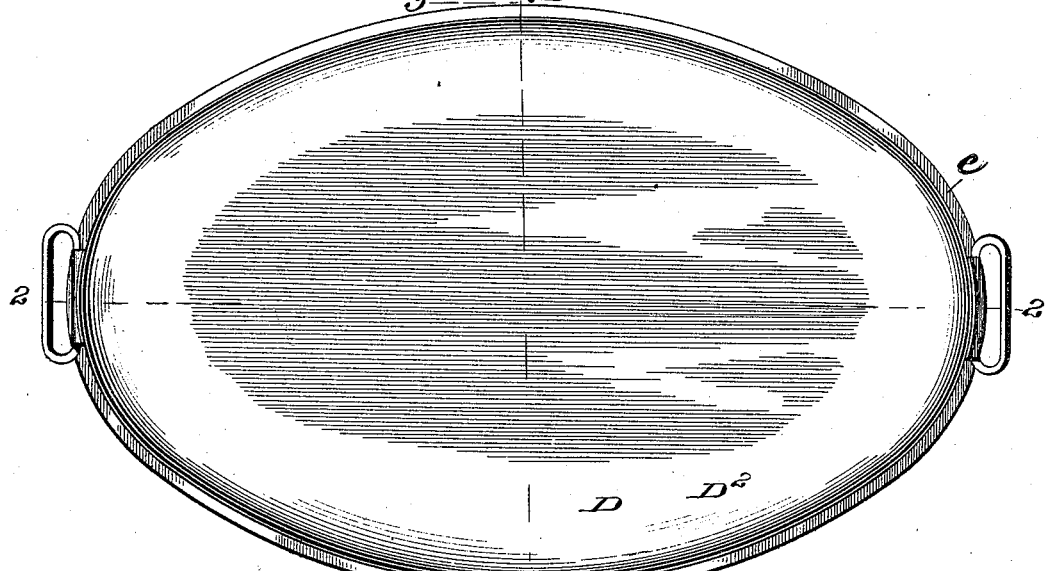
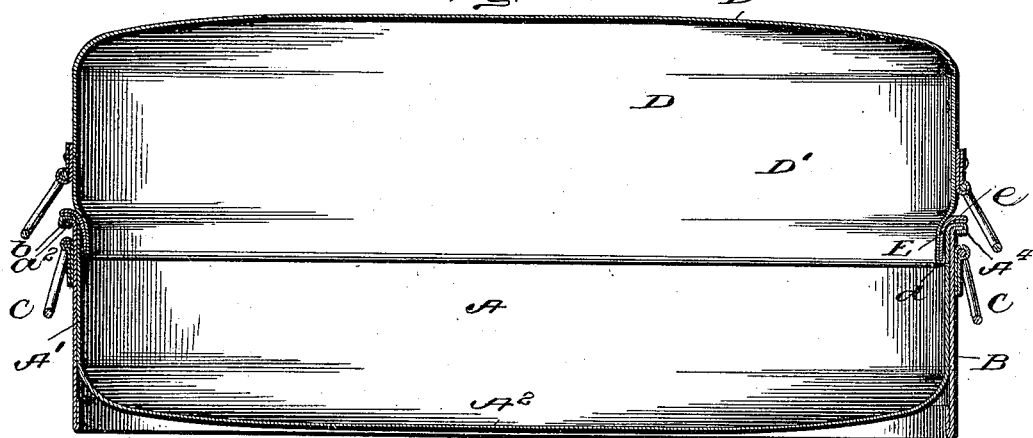
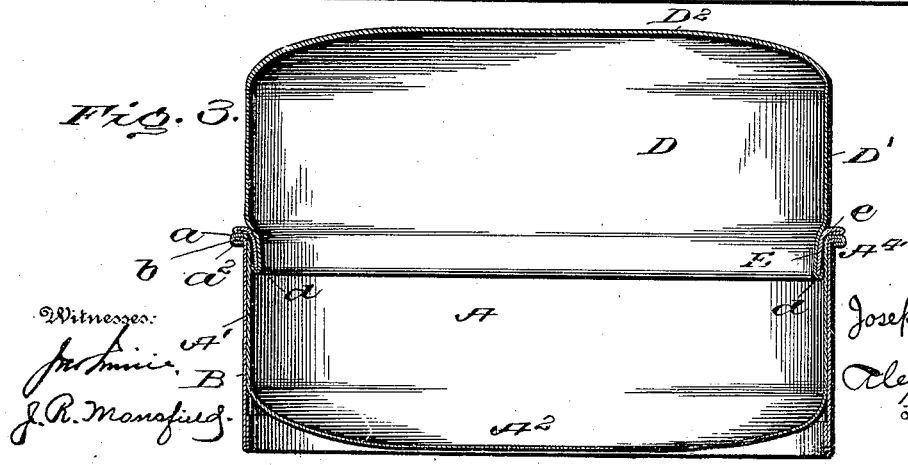
Witnesses:
Inventor:
Joseph Mathy.
by Alexander
Attorneys.

UNITED STATES PATENT OFFICE.

JOSEPH MATHY, OF WASHINGTON, DISTRICT OF COLUMBIA.

BAKING-PAN.

SPECIFICATION forming part of Letters Patent No. 607,759, dated July 19, 1898.

Application filed March 4, 1898. Serial No. 672,581. (No model.)

*To all whom it may concern:*

Be it known that I, JOSEPH MATHY, of Washington, in the District of Columbia, have invented certain new and useful Improvements in Baking-Pans; and I hereby declare that the following is a full, clear, and exact description thereof, reference being had to the accompanying drawings, which form part of this specification.

This invention is an improvement in baking-pans especially designed for cooking meats and other articles of food which are to be baked.

The objects of the invention are to prevent burning of the articles in the pan while cooking them thoroughly and enabling them to be uniformly browned and to enable meats, &c., to be cooked without the addition of any water or lard or fatty compounds by so constructing the pan that the articles will be basted in their own juices and by the steam derived therefrom, thereby preserving the flavor and aroma of the food.

The particular object of the invention is to so construct the baking-pan that it will be absolutely cleanly, and this I accomplish by so forming it that there will be no corners, joints, or angles wherein dirt or other impurities may collect or accumulate in the pan, every part of it being accessible and easily cleansed.

Another object is to so construct the lower or holding portion of the baker that the walls thereof will be practically double and its durability and stiffness proportionately increased. The pan is such that it is practically self-basting, and is also so constructed that there are no sharp angles or corners in which dirt or grease might collect or which render it difficult to clean.

The invention therefore consists in the novel construction of the baking-pan, as hereinafter claimed, and as illustrated in the accompanying drawings, which form a part of this specification, and in which—

Figure 1 is a top plan view of the baking-pan. Fig. 2 is a longitudinal vertical section on line 2 2, Fig. 1. Fig. 3 is a transverse section on line 3 3, Fig. 1.

As shown in the drawings, the pan is oval in plan view, and it is substantially oval in either longitudinal or transverse section. The body of the pan is composed of a metal vessel A, which is preferably formed of a single sheet of metal by stamping or drawing process. The sides of said vessel are perpendicular; but its bottom $A^2$ is concavo-convex in cross-section at any point, the edges of the bottom merging into the lower edges of the sides so gradually that no bends or angles are formed wherein dirt or grease can lodge or accumulate. The shape of the bottom is such that any drippings or condensed steam or exudations from the article being cooked will flow to the center of the bottom, which is its lowest point and where the heat would naturally be greatest, and therefore the hottest part of the pan is continuously kept moist. Moreover, when a piece of meat of the size for which the baking-pan is designed is placed therein it cannot rest flatly upon the bottom, owing to the concavity of the latter, and thus it will be browned on the bottom as well as on the sides and top.

At the top of vessel A is an outwardly-flaring flange $a$, which is preferably formed integral with the sides $A'$ during the spinning or stamping process thereof, and is bent down under and upon itself, as is shown at $a^2$, so as to clamp the outstanding flange $b$ on the upper edge of an oval frame B, of stout sheet metal, which surrounds the vessel A and is of slightly greater height than the depth thereof, so that the vessel is suspended in the frame B, as shown.

It will be observed that, as shown, frame B fits tightly against the sides $A'$ of vessel A, so that the sides thereof and of the frame mutually reinforce and stiffen each other, so that the pan is less liable to be distorted by the weight of the food therein and will be stiffer and stronger and less liable to damage in handling.

As shown, the frame B keeps the bottom of the vessel out of contact with the floor of the oven or stove in or upon which the baking-pan is placed, while the hot air is confined in the space under the bottom.

It will be observed by reference to the drawings that at no point in the vessel is there a seam or sharp bend or corner wherein grease or dirt can collect, and as the integral flanges $a\ a$ of vessel A entirely inclose the flanges $b$ of the frame B the pan can be cleansed with the greatest ease.

The united flanges $a\ b\ a'$ together form a stiff rib $A^4$ around the upper edge of the lower part of the baking-pan, which rib is of material service in preventing breaking of the pan.

It will be observed also that, as shown, there is no break or perforation at any point in the vessel A, and the supporting-handles C are riveted to the frame B.

The cover D of the pan is almost identical in form with the vessel A if inverted, being oval in plan and the top portion $D^2$ of the cover being concavo-convex in any cross-section and merging into the vertical side walls $D'$ thereof in such manner that no angles are formed for the lodgment of grease or dirt.

To the lower edge of the cover, exterior thereto, is fitted a short oval band E, provided with an outwardly-projecting flange $e$ at its upper edge, while its lower edge is secured by turning over it the lower edge of the cover, as at $d$. The part of the cover surrounded by band E is slightly smaller than the upper part of the vessel A, so that the band and lower edge of the cover may slip into the upper edge of the vessel until flange $e$ rests upon the top of the rib $A^4$, as shown. By this construction all water of condensation, &c., on the inner walls of the cover is directed back into the vessel, and the interior of the cover is as smooth as the interior of the vessel, so that there are no angles, bends, or seams in the cover wherein grease or dirt could find lodgment, and the cover can be cleaned as easily and as thoroughly as the vessel. Thus absolute cleanliness of the pan is assured if ordinary care is taken thereof.

When the cover is adjusted upon the vessel A, the pan is closed sufficiently tight to retain all the aroma of the article cooked therein, and the steam which may be generated therefrom is condensed upon the cover and part will be returned to the vessel and part will drop upon the meat or other article in the pan and baste it.

The baking-pan has been thoroughly tested, and it is found that meats cooked therein are browned uniformly and can be cooked without the addition of water or lard or the like, or oils other than those naturally contained therein, that meat cannot be burned unless the pan is subjected to destructive heat, and that there is no waste, because as the escape of moisture is prevented there is practically no loss of weight in the food.

The chief advantages of my cooker are the perfection with which the meats and other articles may be cooked therein, its absolute cleanliness, the absence of any bends or corners or joints wherein grease and dirt may collect and become rancid, and the facility with which the pan can be cleaned; and these advantages I attribute, largely, to the peculiar novel form of the pan and the other novel features of construction above described.

Having thus described my invention, what I therefore claim as new, and desire to secure by Letters Patent thereon, is—

1. In a baking-pan, the combination of a metallic vessel having vertical side walls formed with an outwardly-flaring flange on their upper edges, and its bottom formed integral with said side walls and concavo-convex in any cross-section so as not to present any angles or corners; with a frame surrounding the vessel and having vertical walls fitted closely against the vertical side walls thereof, said frame having an outwardly-flaring flange on its upper edge embraced by and inclosed within the flange on the upper edge of the vessel which is bent thereover, said frame also extending below the bottom of the vessel so as to uphold the same above the surface on which the pan is placed, substantially as and for the purpose described.

2. In a baking-pan, the combination of the imperforate body having vertical side walls and a bottom concavo-convex in any cross-section, and merging into the side walls without seam or angles, and a frame surrounding said vessel and adapted to uphold the same above the surface upon which the pan is placed, said frame being fitted closely against the vertical sides of the vessel so as to stiffen and reinforce the latter throughout, and having an outwardly-flaring flange on its upper edge which is inclosed within an outwardly-flaring flange formed on the upper edge of the vessel; with an imperforate cover having vertical side walls and a top concavo-convex in any cross-section, the edges of the top merging into the side walls without seam or angles, and said cover also having its lower edge adapted to fit within the upper end of the body, whereby a close baking-pan is formed without corners or seams for collection of grease or dirt, all substantially as and for the purpose described.

3. In a baking-pan, the combination of a metallic vessel having vertical side walls formed with an outwardly-flaring flange on their upper edges, and its bottom formed integral with said side walls and concavo-convex in any cross-section so as not to present any angles or corners; with a frame surrounding the vessel and having vertical walls fitted closely against the vertical side walls thereof, said frame having an outwardly-flaring flange on its upper edge embraced by and inclosed within the flange on the upper edge of the vessel, which is bent thereover, said frame also extending below the bottom of the vessel so as to uphold the same above the surface on which the pan is placed; with a cover, constructed substantially like the vessel inverted, having vertical side walls and a top concavo-convex in any cross-section, said cover being provided with an upturned flange on its lower edge adapted to fit within the vessel when the cover is placed thereon, and an exterior band surrounding the lower edge of the cover and fitted into the flange thereof, and having its upper end flanged to support the cover on the
5 flange of the vessel all substantially as and for the purpose described.

In testimony that I claim the foregoing as my own I affix my signature in presence of two witnesses.

JOSEPH MATHY.

In presence of—
   JAMES R. MANSFIELD,
   ARTHUR E. DOWELL.